(12) United States Patent
Bandemer

(10) Patent No.: US 6,912,088 B2
(45) Date of Patent: Jun. 28, 2005

(54) POLARIZATION MODE DISPERSION EMULATOR

(75) Inventor: Adalbert Bandemer, Dachau (DE)

(73) Assignee: Thorlabs GmbH, Karlsfeld (DE)

( * ) Notice: Subject to any disclaimer, the term of this patent is extended or adjusted under 35 U.S.C. 154(b) by 570 days.

(21) Appl. No.: 09/849,080

(22) Filed: May 4, 2001

(65) Prior Publication Data

US 2004/0100694 A1 May 27, 2004

(30) Foreign Application Priority Data

Jul. 12, 2000 (DE) .......................................... 100 33 820

(51) Int. Cl.[7] .............................. G02B 27/28; G02B 6/27
(52) U.S. Cl. ............................. 359/495; 385/11; 385/47
(58) Field of Search ................................ 359/495, 497, 359/499; 385/11, 97, 47

(56) References Cited

U.S. PATENT DOCUMENTS

| 5,430,454 A | * | 7/1995 | Refregier et al. ........... 342/375 |
| 5,473,457 A | | 12/1995 | Ono |
| 5,633,959 A | | 5/1997 | Niki et al. |
| 5,859,939 A | | 1/1999 | Fee et al. |
| 5,911,016 A | | 6/1999 | Naito |
| 5,930,414 A | | 7/1999 | Fishman et al. |
| 6,307,984 B1 | * | 10/2001 | Watanabe ...................... 385/24 |
| 2002/0075477 A1 | * | 6/2002 | Yu et al. ...................... 356/73.1 |

FOREIGN PATENT DOCUMENTS

| DE | 198 16 178 | 10/1999 |
| DE | 198 30 990 | 1/2000 |
| DE | 198 41 755 | 3/2000 |
| EP | 0 271 934 | 11/1987 |
| EP | 0 347 994 | 6/1989 |
| EP | 0 376 449 | 11/1989 |
| EP | 376449 A1 | * | 7/1990 | ............ G01B/9/02 |
| EP | 0 707 226 | 10/1995 | | |
| EP | 0964 237 | 11/1998 | | |
| EP | 0 964 237 | 11/1998 | | |
| EP | WO 01/03336 | 7/2000 | | |
| EP | 1 109 338 | 12/2000 | | |
| WO | WO 99/49340 | 3/1999 | | |
| WO | WO 01/86333 | 5/2001 | | |

OTHER PUBLICATIONS

Teruhiko Kudou, et al., Theoretical Basis of Polarization Mode Dispersion Equalization up to the Second Order, Journal of Lightwave Technology, vol. 18, No. 4, Apr. 2000.
Shimizu, et al. Highly Practical Fiber Squeezer Polarization Controller; Journal of Lightwave Technology, vol. 9, No. 10, Oct. 1991, pp. 12170–1224.

(Continued)

Primary Examiner—Akm Enayet Ullah
Assistant Examiner—Omar Rojas
(74) Attorney, Agent, or Firm—Finnegan, Henderson, Farabow, Garrett & Dunner

(57) ABSTRACT

A system for producing a presettable polarization mode dispersion includes an initial polarization splitter/combiner element, which divides the incoming signal into two signals in vertical polarization alignment to one another, a delaying unit, which is installed in one of the signal paths of the two split signals, and a second polarization splitter/combiner element, which reunites the two separated signals. The invention is distinguished in that, for the production of a second-order polarization mode dispersion, an element is provided which twists the polarization main axles ahead of and behind the element toward one another by an appropriate angle, and that the light signal emitted from this element is fed into a device, which likewise consists of a polarization splitter/combiner element, a delaying path, and an additional polarization splitter/combiner element for bringing the two signal paths back together.

23 Claims, 1 Drawing Sheet

OTHER PUBLICATIONS

Hok Yong Pua et al., An Adaptive First–Order Polarization Mode Dispersion Compensation System Aided by Plarization Scrambling: Theory and Demonstration, Jun., 2000, Journal of Lightwave Technology, vol. 18, No. 6.

Reinhold Noe et al., Polarization Mode Dispersion Compensation at 10, 20, and 40 Gb/s with Various Optical Equalizers, Sep., 1999, Journal of Lightwave Technology vol. 17, No. 9.

B.L. Brezden and D. R. Gardner, The Effect on Some Frescon Analogs on the Aquatic Snail, *Lymnaea stagnalis*, pp. 189–197, Jan., 1980.

Examination Report issued in European Patent Application No. 01 943 025.5–1234 on Jan. 17, 2005 (with translation).

* cited by examiner

POLARIZATION MODE DISPERSION EMULATOR

CROSS-REFERENCE TO RELATED APPLICATIONS

This application claims priority of German patent applications DE10021836.9 and DE10021835.0 filed on May 6, 2000 and DE10033820.8 filed on Jul. 12, 2000.

FIELD OF THE INVENTION

The invention concerns a system for producing a presettable polarization mode dispersion (PMD) according to the general sense of Patent claim 1.

Such systems are necessary, for instance, to produce a certain PMD for measuring or test systems or to compensate PMD-induced distortions in optical transmission systems and particularly transmission fibers.

Because every glass fiber is unintentionally double-refractive to some degree, light signals of various polarization run through glass fiber at diverse collective speeds. Therefore, light particles of diverse polarization reach the receiver at different times with respect to one another; this running time effect results in a broadening of the received signal and thus a reduction of transmission quality. In particular, this can lead to a rise in bit error rates.

Polarization mode dispersion includes all polarization-dependent running time effects, in which the signal spreading can be fully described by the dispersion behavior of two mutually independent, orthogonally related polarization modes. Because double refraction is constantly changing through external influences such as temperature and mechanical load, and in addition depends on the wavelength; there is permanent variation both in the position of the principal states of polarization (PSP) and in the running time difference between the PSPs. This is referred to also as second-degree polarization mode dispersion.

The result of the aforementioned effects is a time-fluctuating wavelength-dependent PMD behavior with time constants on the order of minutes.

BACKGROUND OF THE INVENTION

A familiar system, which is taken as a point of departure in the formulation of the general sense of Patent claim 1, includes an initial polarization splitter/combiner element, which splits the oncoming signal into two signals with mutually perpendicular polarization directions; a delaying unit, which is installed in one of the signal paths of the two (split) signals; and a second polarization splitter/combiner element, which reunites the two severed signals.

This familiar system has the disadvantage that it allows only the compensation of first-degree PMD-induced distortions. However, it is precisely in long transmission paths that second-degree PMD-induced distortions play a considerable role.

Another known system for PMD emulation is, for instance, a system of PM fibers with various or equal group running times, on which a polarization transformation unit is superposed in each case.

SUMMARY OF THE INVENTION

The invention is based on the objective of providing a system to produce a preestablished polarization mode dispersion, which also allows the production of a second-degree polarization mode dispersion, and which matches the PMD of a real transmission fiber as exactly as possible.

A solution of this objective according to the invention is indicated in Patent claim 1. Refinements of the invention are the subject of claim 2, which follows.

According to the invention, in order to produce a polarization mode dispersion that corresponds to the second-degree PMD of a real fiber, the basis is a system according to the introductory statement; this generic system is further refined in that an element is foreseen which twists the polarization main axis before and behind the element by an appropriate angle to one another. The light signal emitted from this element is, according to the invention, fed into a system which also consists of a polarization splitter/combiner element, a delaying path, and another polarization splitter/combiner element to bring the two signal paths together. With this system, in addition to the production of a first-degree polarization mode dispersion, it is also possible to produce a second-degree dispersion. It is especially advantageous that—on the basis of a system according to the general sense of patent claim 1—it is not even necessary to use additional components, which would increase the costs. Instead it is possible to produce a first-degree polarization mode dispersion because the unused input connection of the second polarization splitter/combiner element serves as input connection for the signal. This signal then runs through the delaying path and the first polarization ray divider in the opposite direction to the oncoming signal. At the fourth gate of the first polarization splitter/combiner element, this signal is then uncoupled. The uncoupled signal then shows the desired first- and second-degree polarization mode dispersion.

It is a particular advantage of this system that in order to produce the second-degree PMD, only a single control value, namely the length of the delaying path, must be preset.

It is also preferable, if the angle by which the element twists the polarization main axes with respect to one another, can be entered. It is thereby possible to enter the steepness of the principal state of polarization (PSP) as well as the proportion of the first- and second-degree polarization mode dispersion (PMD).

It has proven particularly useful to select an angle of about 22.5 degrees. With such an angle, the statistical proportion between first- and second-degree PMD can be practically completely adapted to the angle of a real transmission fiber in the optic network.

The most varied known solutions can be applied as delaying paths. For example, it is possible for the delaying path to be produced optically or electrically. In the case of an optical realization, the beam in the delaying path is emitted as a free beam. To adjust the delay, it is necessary to alter the path length over which the beam is emitted as a free beam.

In a further realization of the delaying path, the fibers are exposed to mechanical forces so that the optical parameters of the fibers are modified.

The adjustment of the angle by which the main axes are bent toward or away from one another, can also proceed in various ways:

For instance it is possible that, in order to adjust the angle, two PM fibers are spliced together at an angle corresponding to the angle to be adjusted. It is also possible to adjust the angle by use optical slip rings and/or wave plates.

A whole range of elements, all commercially available, can be employed as polarization splitter/combiner elements.

For instance, the elements can be executed as PBS cubes or as all-in-fiber elements.

In every case, however, it is preferable if all light paths are polarization receivers. This can be achieved, for instance, if free-beam paths and/or PM fibers form the light paths.

BRIEF DESCRIPTION OF THE DRAWINGS

The invention is illustrated in greater detail below by means of an example with reference to the illustration. The illustration is as follows.

DETAILED DESCRIPTION OF THE INVENTION

Figure 1:
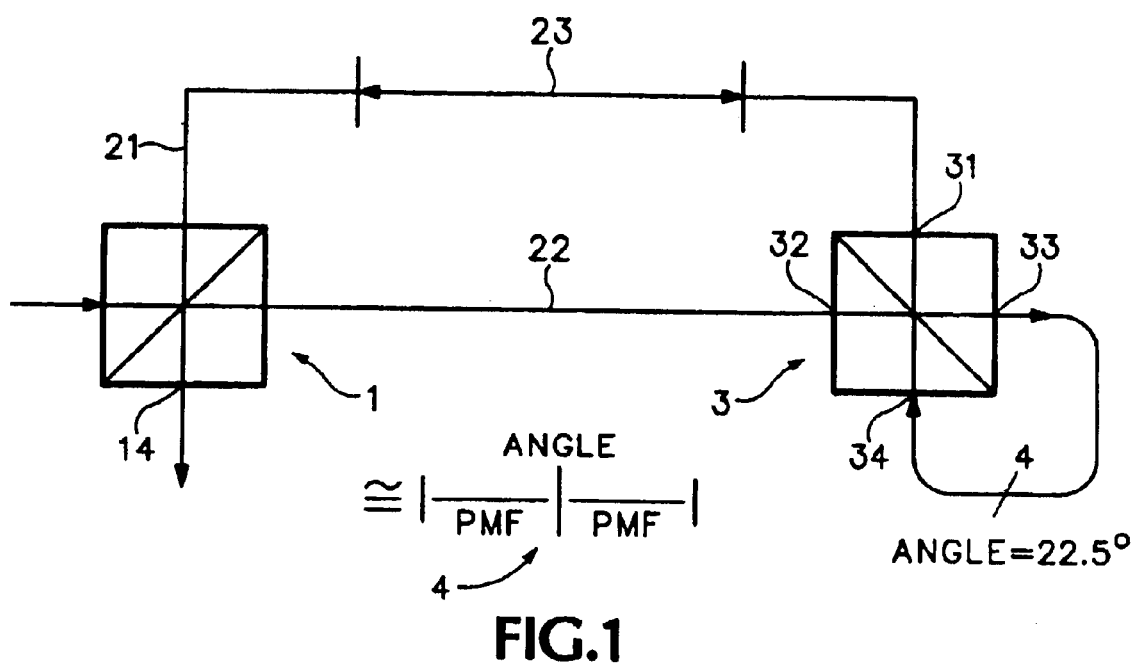
FIG. 1 The theoretical structure of a system according to the invention to produce a presettable polarization mode dispersion.

FIG. 1 shows a system according to the invention, which presents an initial polarization splitter/combiner element (1), at whose connection (11) the incoming light signal arrives. The element (1), in particular, can be a polarization splitter/combiner element, a PBS cube, or an all-in-fiber element. The element (1) splits the incoming signal into two signals with vertical polarization alignment to one another. In the first signal path (21), a delaying unit (23) is installed, which delays the corresponding light signal by an appropriate value. In the other signal path (22) there is no delaying element. A second polarization splitter/combiner element (3), which is reached at its connections (31, 32) by both light signals, brings the delayed and the non-delayed signals back together. The reunited signal exits at the connection (33) of the element (3). To this extent, the structure is known and serves to compensate a first-order polarization mode dispersion.

To produce a second-order polarization mode dispersion, an element (4) is foreseen, which is contacted by the signal exiting from the connection (33), and which twists the polarization main axes before and behind the element by an appropriate angle to one another. This angle can in particular be 22.5 degrees. The light signal emerging from the element (4), whose polarization main axes are twisted by the aforesaid angle, contacts the connection (34) of the element (3).

The element (3) splits the signal arriving at its connection (34) in such a way that it is led back by way of the signal paths (31, 32) again to the element (1).

The polarization splitter/combiner element (1) leads both signals together, the reunited signal exits from the element (1) at the connection (14), where it is transformed in such a way that it compensates a first- and second-order polarization mode dispersion.

In the foregoing the invention has been described by means of an example without applicability and feasibility being considered. It goes without saying that a whole range of transformations are possible. It is possible, for instance, that the angle by which the element twists the polarization main axes against one another is adjustable. To adjust the angle, two PM fibers can be spliced together at an angle corresponding to the angle to be adjusted. As another means of adjusting the angle, optical slip rings and/or oblique-standing wave plates can be used.

What is claimed is:

1. A system for producing a presettable polarization mode dispersion, comprising:
   a first polarization splitter/combiner with a first port, a second port, a third port, and a fourth port, wherein an input signal received at the first port is split into two split signals that are in vertical polarization alignment with one another and coupled out the second and third ports, and wherein a first signal coupled into the second port and a second signal coupled into the third port are combined into an output signal that is coupled out of the fourth port;
   a second polarization splitter/combiner with a fifth port, a sixth port, a seventh, and an eighth port, wherein the fifth port is coupled to receive the first split signal from the second port and the sixth port is coupled to receive the second split signal from the third port, the first split signal and the second split signal being combined to provide a combined signal at the seventh port, and wherein a twisted signal presented at the eighth port is split into two signals that are coupled out of the fifth port and the sixth port;
   a delay element coupled between the third port and the sixth port;
   a twisting element coupled between the seventh port and the eighth port and producing the twisted signal, wherein a polarization main axis of the combined signal and a polarization main axis of the twisted signal are rotated towards one another by an appropriate angle.

2. System according to claim 1, wherein the angle in the twisting element is adjustable.

3. System according to claim 1, wherein the angle in the twisting element is approximately 22.5 degrees.

4. System according to claim 1, wherein the delay element is produced optically, electrically or mechanically.

5. System according to claim 1, wherein the split signal travels through the delay element as a free beam, and length of a delay path within the delay element is adjustable.

6. System according to claim 1, wherein delay in the delay element is produced by exposing a delay path of the delay element-to mechanical forces.

7. System according to claim 1, wherein the angle of the twisting element is adjusted by splicing two PM fibers together at an angle corresponding to the angle to be adjusted.

8. System according to claim 1, wherein the angle of the twisting element is adjusted by optical slip rings and/or oblique-standing wave plates.

9. System according to claim 1, wherein the first and the second polarization splitter/combiner elements are constructed as PBS cubes or as all-in-fiber elements.

10. System according to claim 1, wherein light paths are polarization-maintaining.

11. System according to claim 1, wherein light paths are free-beam paths and/or PM fibers.

12. A system for producing a presettable polarization mode dispersion, comprising:
    a first polarization splitter/combiner that provides two split signals that are in vertical polarization alignment with each other and that correspond with an input signal;
    a second polarization splitter/combiner coupled to the first polarization splitter/combiner that receives the two split signals and combines the two split signals to provide a combined signal;
    a delay element coupled between the first polarization splitter/combiner and the second polarization splitter/combiner so that one of the two split signals is delayed;
    a twisting element coupled to the second polarization splitter/combiner to receive the combined signal and to provide to the second polarization splitter/combiner a twisted signal, wherein a polarization main axis of the combined signal and a polarization main axis of the twisted signal are rotated towards one another by an appropriate angle; and wherein the second polarization splitter/combiner splits the twisted signal into two split twisted signals and outputs the two split twisted signals both along paths of the two split signals but in the opposite direction of the two split signals, and wherein the first polarization splitter/combiner receives the two split twisted signals and combines them into an output signal.

13. System according to claim 12, wherein the angle in the twisting element is adjustable.

14. System according to claim 12, wherein the angle in the twisting element is approximately 22.5 degrees.

15. System according to claim 12, wherein the delay element is produced optically, electrically or mechanically.

16. System according to claim 12, wherein the split signal travels through the delay element as a free beam, and length of a delay path within the delay element is adjustable.

17. System according to claim 12, wherein delay in the delay element is produced by exposing a delay path of the delay element-to mechanical forces.

18. System according to claim 12, wherein the angle of the twisting element is adjusted by splicing two PM fibers together at an angle corresponding to the angle to be adjusted.

19. System according to claim 12, wherein the angle of the twisting element is adjusted by optical slip rings and/or oblique-standing wave plates.

20. System according to claim 12, wherein the first and the second polarization splitter/combiner elements are constructed as PBS cubes or as all-in-fiber elements.

21. System according to claim 12, wherein light paths are polarization-maintaining.

22. System according to claim 12, wherein light paths are free-beam paths and/or PM fibers.

23. Method of producing a presettable polarization mode dispersion, comprising the following steps:

feeding an input signal in a first polarization splitter/combiner with a first port, a second port, a third port and a fourth port, wherein the input signal is received at the first port and split into two split signals that are in vertical polarization alignment with one another and are coupled out of the second and third ports, passing the two split signals through signal paths, wherein one of the signal paths comprises a delay, feeding the two split signals into a second polarization splitter/combiner with a fifth port, a sixth port, a seventh port and an eighth port, wherein the second polarization splitter/combiner receives the two split signals in the fifth and the sixth ports, combines the two split signals to provide a combined signal coupled out of the seventh port;

feeding the combined signal into a twisting element wherein the twisting element receives the combined signal and provides a twisted signal, wherein a polarization main axes of the combined signal and a polarization main axes of the twisted signal are rotated towards one another by an appropriate angle;

feeding the twisted signal into the eighth port of the second polarization splitter/combiner which splits the twisted signal into two split twisted signals and outputs the two split twisted signals from the fifth and the sixth ports of the second polarization splitter/combiner;

passing the two split twisted signals through the signal paths and feeding the two split twisted signals into the second and third ports of the first polarization splitter/combiner wherein the two split twisted signals are combined into an output signal, and the output signal is coupled out of the fourth port of the first polarization splitter/combiner.

* * * * *